United States Patent Office 3,530,122
Patented Sept. 22, 1970

3,530,122
6 - PHOSPHONOMETHYL - 2 - [2 - (5 - NITRO-2-FURYL)VINYL]PYRIDINES AND THEIR ALKALI METAL SALTS, AND PRODUCTION THEREOF
Shinsaku Minami, Yamatokouriyama-shi, Tadatsugu Yamamoto, Nara-shi, Masanao Shimizu, Kobe-shi, and Yoshiyuki Takase, Itami-shi, Japan, assignors to Dainippon Pharmaceutical Co., Ltd., a corporation of Japan
No Drawing. Filed Oct. 17, 1968, Ser. No. 768,529
Claims priority, application Japan, Oct. 21, 1967, 42/67,997
Int. Cl. C07d 31/28
U.S. Cl. 260—240
5 Claims

ABSTRACT OF THE DISCLOSURE

6 - phosphonomethyl-2-[2-(5-nitro-2-furyl)vinyl]pyridine and its N-oxide of the formula:

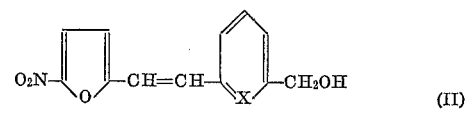

wherein X is N or N→O, and their alkali metal salts, which have high antimicrobial activity and are soluble in water with facility. The water solubilities of 6-phosphonomethyl-2-[2-(5-nitro-2-furyl)vinyl]pyridine monosodium salt and of 6-phosphonomethyl-2-[2-(5-nitro-2-furyl)vinyl]pyridine N-oxide monosodium salt are about 1000 times those of the corresponding 6-hydroxymethyl compounds.

---

The present invention relates to 6-phosphonomethyl-2-[2-(5-nitro-2-furyl)vinyl]pyridines (hereinafter referred to as "phosphorylated nitrofuran derivative(s)") and their alkali metal salts, and production thereof.

The said phosphorylated nitrofuran derivatives include specifically 6 - phosphonomethyl - 2-[2-(5-nitro-2-furyl) vinyl]pyridine and its N-oxide and are representable by the following formula:

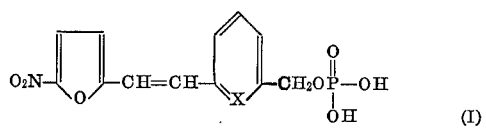

wherein X is N or N→O.

Hitherto, there have been known a number of nitrofuran derivatives possessing appreciable antimicrobial activity. Those are, however, generally soluble in water with much difficulty, and their practical utilization is obliged to be considerably restricted. 6-hydroxymethyl-2-[2-(5-nitro-2-furyl)vinyl]pyridine and its N-oxide (hereinafter referred to as "unphosphorylated nitrofuran derivative(s)") represented by the following formula:

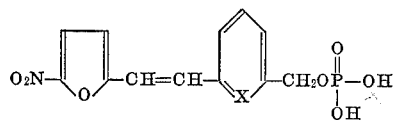

wherein X is as defined above [J. Pharm. Soc. Japan (Yakugaku Zasshi), 86, 1014 (1966)] exhibit noticeable antimicrobial activity but are not exceptional in the difficult solubility in water.

It has now been discovered that the phosphorylated nitrofuran derivatives (I) and their alkali metal salts, prepared from the unphosphorylated nitrofuran derivatives (II), are highly soluble in water without losing the excellent antimicrobial potency of the original compounds. The present invention is based on this discovery.

Accordingly, a basic object of the present invention is to embody the phosphorylated nitrofuran derivatives (I) and their alkali metal salts. Another object of this invention is to embody the highly water-soluble phosphorylated nitrofuran derivatives (I) and their alkali metal salts possessing excellent antimicrobial activity. A further object of the invention is to embody a process for preparing the phosphorylated nitrofuran derivatives (I) and their alkali metal salts. These and other objects will be apparent to those conversant with the art to which the present invention pertains from the subsequent descriptions.

In accordance with the present invention, the phosphorylated nitrofuran derivative (I) is prepared by reacting the unphosphorylated nitrofuran derivative (II) with a phosphorylating agent in the presence or absence of a solvent. Examples of the phosphorylating agent are phosphoric anhydride, phosphorus oxychloride, phosphorus trichloride, morpholinophosphodichloridate and P¹-diphenyl-P²-morpholinopyrophosphorus chloridate. As the solvent, there may be used a non-polar solvent such as benzene or ether. The reaction can proceed at a room temperature but is preferred to effect at a temperature around 50° C.

The resulting phosphorylated nitrofuran derivative (I) is optionally converted into its alkali metal salt by treatment with an aqueous solution of an alkali metal hydroxide (e.g. sodium hydroxide, potassium hydroxide, etc.), an alkali metal carbonate (e.g. sodium carbonate, potassium carbonate, etc.) or the like.

The antimicrobial activity (e.g. antibacterial activity, antifungal activity, antiprotozoal activity) of the thus obtained phosphorylated nitrofuran derivatives (I) and their alkali metal salts is relatively low in vitro but considerably high in vivo. Further, the toxicity of them is so weak as can be practically used. For instance, 6-phosphonomethyl-2-[2-(5-nitro-2-furyl)vinyl]pyridine N-oxide monosodium salt exhibits the same level potency as 6-hydroxymethyl- 2-[2-(5-nitro-2-furyl)vinyl]pyridine N-oxide and chloramphenicol in the test on the therapeutic effect against *Salmonella typhimurium* or *Staphylococcus aureus* infection in mice with the similar level toxicity to the latter compounds, as shown in the following table:

TABLE

| Test compound | Administration route | ED$^{50}$ (mg./kg.) Salmonella typhimurium infection [1] | ED$^{50}$ (mg./kg.) Staphylococcus aureus infection [2] | LD$_{50}$ (mg./kg.) [3] |
|---|---|---|---|---|
| 6-phosphonomethyl-2-[2-(5-nitro-2-furyl)-vinyl]pyridine N-oxide monosodium salt. | Intravenous | 4.1 | 14.4 | 354 |
| | Intraperitoneal | 1.5 | | 397 |
| | Subcutaneous | 4.7 | | 445 |
| | Oral | 12.5 | 43.5 | 1,500 |
| 6-hydroxymethyl-2-[2-(5-nitro-2-furyl)-vinyl]pyridine N-oxide | Intravenous | | | |
| | Intraperitoneal | 1.6 | | 707 |
| | Subcutaneous | | | |
| | Oral | 8.8 | | 1,310 |
| Chloramphenicol | Intravenous | 14.9 | 30.8 | 100–200 |
| | Intraperitoneal | 17.7 | | 1,320 |
| | Subcutaneous | 12.1 | | |
| | Oral | 13.6 | 23.3 | 2,640 |

[1] Administered once a day for 2 consecutive days.
[2] Administered once a day for 8 consecutive days.
[3] Acute toxicity in mice.

Compared with the corresponding unphosphorylated nitrofuran derivatives (II), the phosphorylated nitrofuran derivatives (I) and their alkali metal salts are dissolved well in water. Particularly, the alkali metal salts show markedly improved water solubility. For instance, the water solubilities of 6-phosphonomethyl-2-[2-(5-nitro-2-furyl)vinyl]-pyridine monosodium salt and of 6-phosphonomethyl-2-[2-(5-nitro-2-furyl)vinyl]pyridine N-oxide monosodium salt are about 20 to about 40 mg./ml. at 10 to 20° C., whereas those of the corresponding 6-hydroxymethyl compounds are only about 0.030 to 0.035 mg./ml. at the same temperature.

Therefore, the phosphorylated nitrofuran derivatives (I) and their alkali metal salts are useful as medicaments for human beings and animals and also as food preservatives. It is particularly advantageous that they can be used not only in solid preparation forms but also in aqueous solutions such as injection.

Practical and presently-preferred embodiments of the present invention are illustratively shown in the following examples.

EXAMPLE 1

To a mixture of phosphoric anhydride (15 g.) and 85% phosphoric acid (19.5 g.) stirred at 50° C. for 1 hour, 6-hydroxymethyl-2-[2-5-nitro-2-furyl)vinyl]pyridine (3.7 g.) is added, and the resultant mixture is stirred at 50 to 55° C. for 6 hours. The reaction mixture is poured into water (130 ml.) and heated on a water bath for 40 minutes. After cooling, the precipitate is collected by filtration and recrystallized from water to give 6-phosphonomethyl-2-[2-(5-nitro-2-furyl)vinyl]pyridine (4.5 g.) as yellow needles melting at 221° C. (decomposed).

The yellow needles (1.0 g.) are dissolved in 10% sodium carbonate solution, admixed with active carbon (100 mg.) and filtered. The filtrate is made acidic with acetic acid and concentrated under reduced pressure to about 10 ml. The precipitate is collected by filtration and recrystallized from water to give 6-phosphonomethyl-2-[2-(5-nitro-2-furyl)-vinyl]pyridine monosodium salt (0.8 g.) as crystals melting at 225 to 230° C. (carbonized).

EXAMPLE 2

To a mixture of phosphoric anhydride (15 g.) and 85% phosphoric acid (19.5 g.) stirred at 50° C. for 1 hour, 6-hydroxymethyl-2-[2-(5-nitro-2-furyl)vinyl]pyridine N-oxide (3.9 g.) is added, and the resultant mixture is stirred at 50 to 55° C. for 6 hours. The reaction mixture is poured into water (130 ml.) and heated on a water bath for 40 minutes. After cooling, the precipitate is collected by filtration and recrystallized from water to give 6-phosphonomethyl-2[2-(5-nitro-2-furyl vinyl]pyridine N-oxide (4.7 g.) as yellow needles melting at 242° C. (decomposed).

The yellow needles (1.0 g.) are dissolved in 10% sodium carbonate solution, admixed with active carbon (100 mg.) and filtered. The filtrate is made acidic with acetic acid and concentrated under reduced pressure to about 10 ml. The precipitate is collected by filtration and recrystallized from water to give 6-phosphonomethyl-2-[2-(5-nitro - 2 - furyl)vinyl]pyridine N - oxide monosodium salt (0.75 g.) as crystals not melting at a temperature lower than 300° C.

What is claimed is:

1. A compound of the formula:

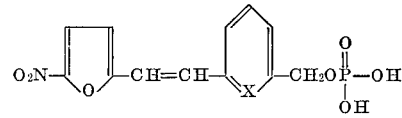

wherein X is N or N→O, or its alkali metal salt.

2. The compound according to claim 1, wherein said compound is 6-phosphonomethyl - 2 - [2-(5-nitro-2-furyl) vinyl]-pyridine, or its alkali metal salt.

3. The compound according to claim 2, wherein the alkali metal salt is the monosodium salt.

4. The compound according to claim 1, wherein said compound is 6-phosphonomethyl - 2 - [2-(5-nitro-2-furyl) vinyl]-pyridine N-oxide, or its alkali metal salt.

5. The compound according to claim 4, wherein the alkali metal salt is the monosodium salt.

References Cited

UNITED STATES PATENTS

| 2,497,731 | 2/1950 | Hoffman | 260—297 |
| 2,497,732 | 2/1950 | Hoffman | 260—297 |
| 2,666,061 | 1/1954 | Harris et al. | 260—297 |

FOREIGN PATENTS

| 1,053,730 | 1/1967 | Great Britain. |

JOHN D. RANDOLPH, Primary Examiner

U.S. Cl. X.R.

424—264

UNITED STATES PATENT OFFICE
CERTIFICATE OF CORRECTION

Patent No. 3,530,122      Dated September 22, 1970

Inventor(s) Shinsaku Minami, Tadatsugu Yamamoto, Masanao Shimizu, and Yoshikuyi Takase It is certified that error appears in the above-identified patent and that said Letters Patent are hereby corrected as shown below:

In the title, cancel "phosphonomethyl", insert --phosphonoxymethyl--

At column 1, lines 19, 36, 41 and 47; column 2, line 61; column 3, lines 28 and 61; and column 4, lines 23 and 31, cancel "phosphonomethyl", insert --phosphonoxymethyl--.

In the Table, in the column headed "Test Compound", cancel "phosphonomethyl", insert --phosphonoxymethyl--.

At column 1, line 35; and column 3, line 30, cancel "phonomethyl", insert --phonoxymethyl--.

At column 3, line 53, cancel "6-phosphono-", insert --6-phosphonoxy- --

In claim 2, line 2; and claim 4, line 2, cancel "6-phosphonomethyl", insert --6-phosphonoxymethyl--.

SIGNED AND SEALED
DEC 15 1970

(SEAL)
Attest:

Edward M. Fletcher, Jr.
Attesting Officer

WILLIAM E. SCHUYLER, JR.
Commissioner of Patents